US009152619B2

(12) United States Patent
Meschkat

(10) Patent No.: US 9,152,619 B2
(45) Date of Patent: Oct. 6, 2015

(54) SYSTEM AND METHOD FOR CONSTRUCTING MARKUP LANGUAGE TEMPLATES AND INPUT DATA STRUCTURE SPECIFICATIONS

(75) Inventor: Steffen Meschkat, Zurich (CH)

(73) Assignee: Google Inc., Mountain View, CA (US)

( * ) Notice: Subject to any disclaimer, the term of this patent is extended or adjusted under 35 U.S.C. 154(b) by 622 days.

(21) Appl. No.: 13/476,299

(22) Filed: May 21, 2012

(65) Prior Publication Data

US 2015/0178263 A1 Jun. 25, 2015

(51) Int. Cl.
G06F 17/00 (2006.01)
G06F 17/24 (2006.01)
G06F 17/21 (2006.01)
G06F 17/22 (2006.01)
G06F 9/44 (2006.01)

(52) U.S. Cl.
CPC ............ *G06F 17/248* (2013.01); *G06F 17/218* (2013.01); *G06F 17/2247* (2013.01); *G06F 8/74* (2013.01)

(58) Field of Classification Search
CPC . G06F 17/243; G06F 17/248; G06F 17/2247; G06F 17/30893; G06F 8/38; G06F 3/0481; G06F 8/74; H04L 67/02
USPC ......... 715/200, 204, 221–226, 234, 243–253, 715/262, 273–277, 730, 760, 762, 780; 717/104, 105; 707/E17.116, E17.117, 707/737
See application file for complete search history.

(56) References Cited

U.S. PATENT DOCUMENTS 6,886,136 B1 * 4/2005 Zlotnick et al. ............... 715/780
7,231,599 B2 * 6/2007 Yamada et al. ................ 715/246
7,376,659 B2 * 5/2008 Abe et al. ...................... 707/749
7,505,984 B1 3/2009 Nevill-Manning et al.
7,581,170 B2 * 8/2009 Baumgartner et al. ....... 715/234
7,660,804 B2 2/2010 Wen et al.
7,669,119 B1 2/2010 Orelind et al.
7,764,830 B1 * 7/2010 Wnek ............................ 382/159
7,844,897 B1 * 11/2010 Cooley et al. ................. 715/243

(Continued)

OTHER PUBLICATIONS

Besbes, S. et al.,"RetroWeb: A Web Site Reverse Engineering Approach," ICWE 2004, LNCS 3140, pp. 306-310, © Springer-Verlag Berlin Heidelberg 2004.*

(Continued)

*Primary Examiner* — Cesar Paula
*Assistant Examiner* — James H Blackwell
(74) *Attorney, Agent, or Firm* — Dority & Manning, P.A.

(57) ABSTRACT

Systems and methods for constructing a markup language template and corresponding input data structure specification are provided. A plurality of different markup language representations of a user interface can be obtained multiple times for different input data for a web application. The different markup language representations can be aligned and compared to identify both common elements and variable elements. A markup language template can be constructed that includes the common elements. The variable elements can represent the input data associated with markup language representations. From a detected variable element, three things can be generated: (1) a data field associated with the variable element in an input data structure corresponding to the markup language template; (2) a template processing instruction that maps the data field of the input data structure to the newly constructed markup language template; and (3) an instance of the input data structure.

19 Claims, 4 Drawing Sheets

(56) References Cited

U.S. PATENT DOCUMENTS

| | | | |
|---|---|---|---|
| 7,954,053 B2 | 5/2011 | Orelind et al. | |
| 8,117,203 B2* | 2/2012 | Gazen et al. | 707/728 |
| 8,762,829 B2* | 6/2014 | Dalvi et al. | 715/234 |
| 8,843,490 B2* | 9/2014 | Gazen et al. | 707/737 |
| 2002/0143659 A1 | 10/2002 | Keezer et al. | |
| 2003/0009563 A1 | 1/2003 | Douglis et al. | |
| 2004/0268303 A1* | 12/2004 | Abe et al. | 717/108 |
| 2006/0100858 A1 | 5/2006 | McEntee et al. | |
| 2007/0143745 A1 | 6/2007 | Dasari et al. | |
| 2008/0086682 A1 | 4/2008 | Derricott et al. | |
| 2009/0074303 A1* | 3/2009 | Filimonova et al. | 382/224 |
| 2009/0276506 A1 | 11/2009 | Tiwari et al. | |
| 2010/0185654 A1 | 7/2010 | Fortuna et al. | |
| 2010/0185934 A1 | 7/2010 | Fortuna et al. | |
| 2010/0257440 A1* | 10/2010 | Kshirsagar et al. | 715/230 |
| 2010/0306738 A1 | 12/2010 | Verma et al. | |
| 2011/0087960 A1 | 4/2011 | Tabone et al. | |
| 2011/0307479 A1* | 12/2011 | Yin et al. | 707/728 |

OTHER PUBLICATIONS

Virgilio, R. et al.,"A Structured Approach to Data Reverse Engineering of Web Applications," M. Gaedke, M. Grossniklaus, and O. Díaz (Eds.): ICWE 2009, LNCS 5648, pp. 91-105, 2009, © Springer-Verlag Berlin Heidelberg 2009.*
Maras et al.,"Reverse engineering legacy Web applications with phpModeler," JCIS, 2011, pp. 82-93.*
Vanderdonckt et al.,"Flexible Reverse Engineering of Web Pages with Vaquista," © 2001, 8 pages.*
Bouillon, L. et al.,"Reverse Engineering of Web Pages based on Derivations and Transformations," in Proc. 3$^{rd}$ Latin American Web Congress (LA-Web'05), © 2005, IEEE, 11 pages.*
Chikofsky, E. et al.,"Reverse Engineering and Design Recovert: A Taxonomy," © Jan. 1990, IEEE, pp. 13-17.*
Bergman, L. et al.,"Combining Handcrafting and Automatic Generation of User Interfaces for Pervasive Devices," in Computer-Aided Design of User Interfaces III, © 2002, Kluwer Academic Publishers, pp. 155-166.*
Bouillon, L. et al.,"Recovering Alternative Presentation Models of a Web Page with Vaquita," in Computer-Aided Design of User Interfaces III, © 2002, Kluwer Academic Publishers, pp. 311-322.*
Di Lucca, G.A. et al.,"WARE: a tool for the Reverse Engineering of Web Applications," in Proc. 6$^{th}$ European Conf. on Software Maintenance and Reengineering (CSMR'02), © 2002, IEEE, 14 pages.*
Gaeremynck, Y. et al.,"MORE for Less: A Model Recovery from Visual Interfaces for Multi-Device Application Design," in IUI'03, Jan. 12-15, 2003, ACM, 8 pages.*
Paganelli, L. et al.,"Automatic Reconstruction of the Underlying Interaction Design of Web Applications," in Proc. of the 14th Intl. Conf. on Software Engineering and Knowledge Engineering (SEKE '02), © 2002, ACM, pp. 439-455.*
Di Lucca, G.A. et al.,"An Approach for Reverse Engineering of Web-Based Applications," © 2001, IEEE, pp. 231-240.*
Cai, D. et al.,"Extracting Content Structure for Web Pages based on Visual Representation," in Proc. 5th Asia-Pacific Web Conference on Web Technologies and Applications (APWeb'03), © 2003}, pp. 406-417.*
Kong, L, et al.,"Legacy Interface Migration: A Task-Centered Approach," in Proc. 8$^{th}$ Intl. Conf. on Human-Computer Interaction, © 1999, pp. 1167-1171.*
Moore, M.,"Rule—Based Detection for Reverse Engineering User Interfaces," in Proc. WCRE'96, © 1996, IEEE, pp. 42-48.*
Moore, M. et al.,"Using Knowledge Representation to Understanding Interactive Systems," © 1997, IEEE, pp. 60-67.*
Draheim, D. et al.,"Source—Code Independent Reverse Engineering of Dynamic Web Sites," in Proc. 9th European Conference on Software Maintenance and Reengineering (CSMR'05), © 2005 IEEE, 10 pages.*
Crescenzi, V. et al.,"RoadRunner: Towards Automatic Data Extraction from Large Web Sites," in Proc. 27th Intl. Conf. on Very Large Data Bases (VLDB '01), © 2001, pp. 109-118.*
Crescenzi, V. et al., "Automatic Information Extraction from Large Websites," J. ACM, © Sep. 2004, vol. 51, No. 5}, pp. 731-779.*

* cited by examiner

SYSTEM AND METHOD FOR CONSTRUCTING MARKUP LANGUAGE TEMPLATES AND INPUT DATA STRUCTURE SPECIFICATIONS

FIELD

The present disclosure relates generally to template processing, and more particularly, to techniques for constructing templates to be used in template processing of web documents, such as HyperText Markup Language (HTML) documents.

BACKGROUND

In typical web applications, data are presented to a user by formatting the data as HTML documents using template processing. In template processing, a document, such as a web page, can be generated using structured input data and a template. The structured input data contain the data to be presented in the document and the template specifies the layout of the document and how to bind the input data to the document.

There are a great variety of different template processing systems in use. These different template processing systems can include different types of layout instructions that specify the layout of a document and/or template-processing instructions that specify how to bind input data to the template. Template-processing instructions can be very diverse ranging from simple variable substitution or can be relatively complex and can be as powerful as general purpose programming instructions.

In some cases, it can be desirable to migrate a web application from one type of template processing system to another type of template processing system. For instance, an improved template processing system for a web application can be developed and it can be desirable to migrate a web application from the old template processing system to the new template processing system. In general, this migration from one template processing system to another involves the manual rewrite of the templates from the old template syntax to the new template syntax. It can be difficult to automate rewriting of templates from one template syntax to another because many template processing systems have no notion of syntactic correctness of the output of the template.

SUMMARY

Aspects and advantages of the invention will be set forth in part in the following description, or may be obvious from the description, or may be learned through practice of the invention.

One exemplary aspect of the present disclosure is directed to a computer-implemented method for constructing a template for use in template processing of a document associated with a web application. The method includes accessing a plurality of markup language representations of a user interface of the web application. Each of the plurality of markup language representations are based on different input data for the web application. The method includes comparing the plurality of markup language representations to identify at least one common element and at least one variable element and constructing a markup language template that includes the at least one common element. The method further includes generating an input data structure associated with the markup language template based on the at least one variable element. The input data structure includes at least one data field associated with the variable element. The method further includes generating a template processing instruction for the markup language template. The template processing instruction maps the at least one data field of the input data structure to the markup language template.

Other exemplary implementations of the present disclosure are directed to systems, apparatus, computer-readable media, devices, and user interfaces for constructing a markup language template to generate a document, such as an HTML document.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
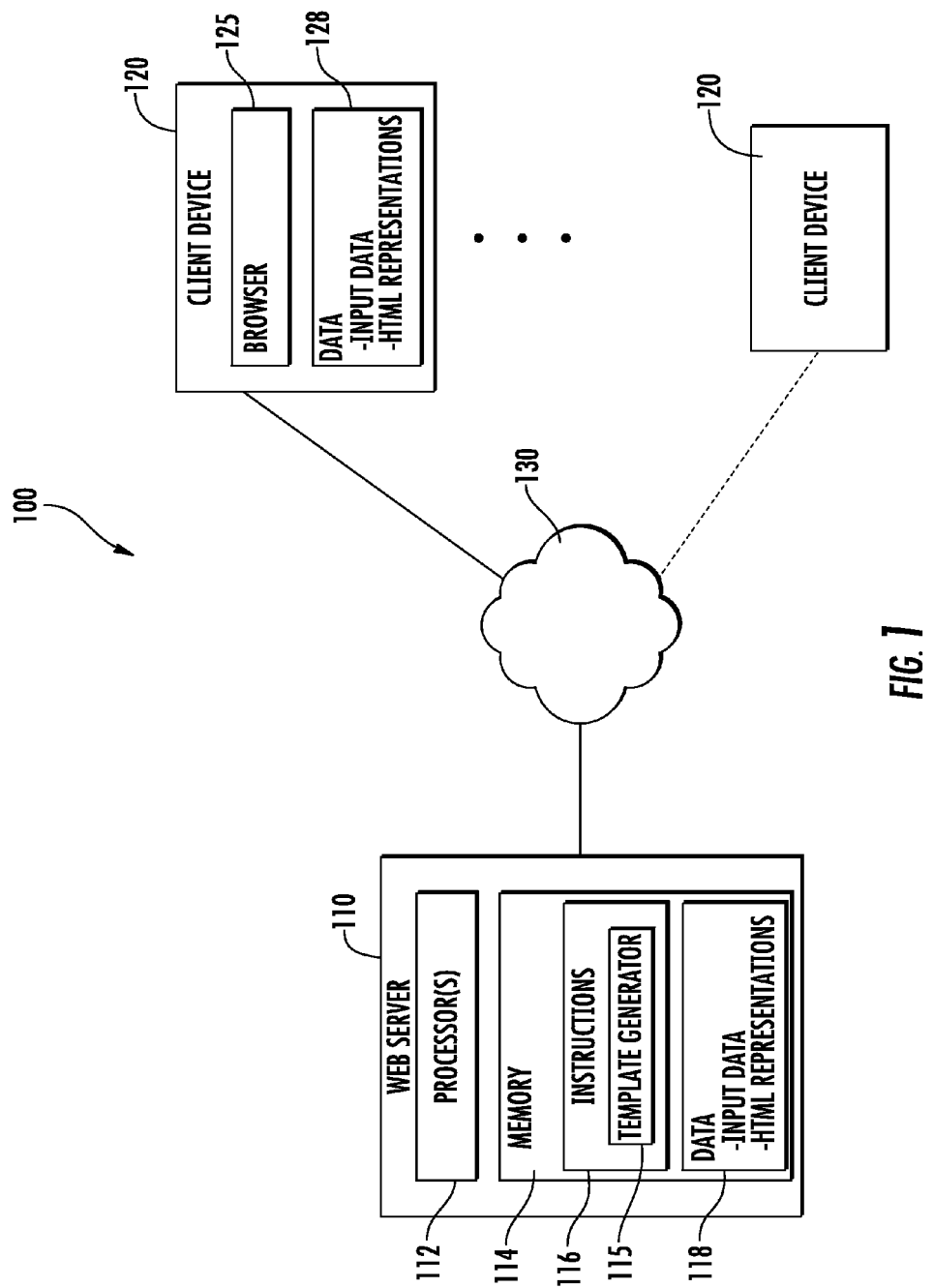
FIG. 1 depicts an exemplary computing environment according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to computer-implemented systems and methods for constructing templates to be used during template processing of documents associated with a web application, such as a web search application or a web based email service. According to aspects of the present disclosure, a plurality of different markup language representations of a user interface of a web application can be obtained multiple times for different input data. The plurality of different markup language representations of the web application can be the markup language output, such as the HTML output, from other template processing systems. The different markup language representations can correspond to the same state of the web application or to different states of the web application. The different markup language representations can be aligned and compared to identify both common elements and variable elements (i.e. elements that differ between the plurality of different markup language representations of the web application).

A markup language template can be constructed that includes the common elements. In many cases, the common elements can include layout instructions that specify the layout of a document associated with the web application. For instance, the newly constructed markup language template can include layout instructions that specify the layout of the document associated with the web application that are common between the plurality of different markup language representations of the user interface of the web application.

The variable elements can represent the input data associated with markup language representations. From a detected variable element, three things can be generated: (1) a data field associated with the variable element in an input data structure corresponding to the markup language template; (2) a template processing instruction that maps the data field of the input data structure to the newly constructed markup language template; and (3) an instance of the input data structure.

In a particular implementation, the multiple different markup language representations can be compared to identify one or more repeated elements that are repeated a different number of times in the markup language representations. The identified repeated elements can be indicative of iteration sections of the web application, such as a listing of emails or search results, that can vary in number depending on the available input data associated with iteration section. The identified repeated elements can be used to create an iteration section in the markup language template. In addition, a repeated field in the input data structure can be generated and mapped to the iteration section in the markup language template with a template processing instruction. The variable elements associated with repeated elements in the markup language representations can be used to generate a second input data structure. The second input data structure can be associated with the repeated field in the input data structure such that the repeated field in the input data structure refers to elements in the second input data structure.

According to a particular aspect of the present disclosure, multiple different markup language representations associated with different application states of the web application can be compared to identify one or more missing elements in one of the markup language representations relative to the other markup language representations. The one or more missing elements can be used to generate a conditional section in the markup language template. In addition, a Boolean field in the input data structure can be created. The input data associated with the Boolean field can control the state of the web application. The set of all the conditional sections in the markup language template can effectively represent the application state, similar to a model in a model-view-controller implementation of the web application.

The newly created markup language template can be provided in a format that is a template and is also a valid document for display for the web application. For instance, template processing instructions associated with the markup language template can be embedded as custom HTML attributes in the markup language template. As a result, the markup language template constructed according to aspects of the present disclosure can be in proper HTML and can be syntactically well defined.

In accordance with the above aspects of the present disclosure, a markup language template can be constructed that holds all of the markup language elements, such as HTML elements, that can be shown in a web application. The markup language template can include template processing instructions specifying bindings to an input data structure having multiple example instances that is able to present all the data that are ever shown across multiple different states of the web application. The markup language template can be syntactically well defined and amenable to post processing to clean up the markup language template, such as by refactoring or by removing unused rules, such as unused cascading style sheet (CSS) rules. In this manner, the systems and methods of the present disclosure provide an improved tool for migrating web applications from an old template processing system to a new template processing system.

FIG. 1 depicts an exemplary computing environment 100 according to an exemplary embodiment of the present disclosure. The computing environment 100 can include any number of computing systems that include one or more computing devices having any suitable computational ability. Computing environment 100 depicted in FIG. 1 includes a server 110 and one or more client devices 120 connected over a network 130. One of client devices 120 is illustrated in dashed line to indicate that any number of client devices 120 can be connected to server 110 over network 130.

While FIG. 1 illustrates one example of a computing environment 100 that can be used to implement the methods of the present disclosure, those of ordinary skill in the art, using the disclosures provided herein, will recognize that the inherent flexibility of computer-based systems allows for a great variety of possible configurations, combinations, and divisions of tasks and functionality between and among the components. For instance, the methods discuss herein can be implemented using a single computing device or multiple computing devices.

Network 130 can include any number of wired or wireless communication links for coupling together computing devices. For instance, network 130 can include one or more of a cellular network, WiFi network, LAN, WAN, the Internet, and/or other suitable network. Server 110 can include a network interface to allow communications with the client devices 120 over network 130. Similarly, client device 120 can include a network interface to allow communication with the server 110 over the network 130. The server 110 and the client device 120 can exchange information over the network 130 in any suitable format. For instance, the information can include markup language messages, such as HTML messages, XML messages, XHTML messages or other suitable format.

Server 110 can include any computing device configured to exchange information with the client device 120. In one embodiment, the server 110 can be a web server that can host web pages, web sites, web applications, and/or other server-client applications. For instance server 110 can host a web search application or a web based email service. Server 110 can include a processor(s) 112 and a memory 114. The processor(s) 112 can be any known processing device, such as a microprocessor, digital signal processor, controller, or other suitable processing device. Memory 114 can include any suitable computer-readable medium or media, including, but not limited to volatile memory, non-volatile memory, RAM, ROM, hard drives, flash drives, magnetic and optical storage devices, or other memory devices.

Memory 114 can store information accessible by processor(s) 112, including computer-readable instructions 116 that can be executed by processor(s) 112. The instructions 116 can be any set of instructions that when executed by processor(s) 112 cause the processor(s) 112 to provide desired functionality, such as any of the template processing techniques disclosed herein. As shown in FIG. 1, the processor 112 can execute instructions 116 to implement a template generator 115 to construct a markup language template according to any of the embodiments of the present disclosure discussed herein. The instructions 116 can be software instructions rendered in a computer-readable form. When software is used, any suitable programming, scripting, or other type of language or combinations of languages may be used to implement the teachings contained herein. Alternatively, the instructions can be implemented by hard-wired logic or other circuitry, including, but not limited to application-specific circuits.

Memory 114 can store data 118 that can be accessed and/or manipulated by processor(s) 112. For instance, memory 114 can store server side input data that can be used to generate a document, such as an HTML document for presentation in a browser 125 of a client device 120. The data 118 can also include markup language representations, such as HTML representations, of a user interface associated with a web application, such as a web search application. The data 118 can be stored in one or more databases. The databases can be split up so they are in multiple locales. The databases data can be coupled to server 110 through a high bandwidth LAN or WAN or through network 130.

Client device 120 can generally include any node on the network 130 that includes computational ability and that can communicate with server 110. For instance, the client device 120 can be a personal computer, smartphone, desktop, laptop, smart device, PDA, tablet, or other computing device. The client device 120 can include a processor and a memory and can include appropriate input and output devices, such as a display screen, touch screen, touch pad, data entry keys, speakers, and/or microphone suitable for voice recognition. The client device 120 can be configured to display information to users through a suitable user interface.

Client device 120 can host a browser 125 which can be any application that can display web documents, such as a web browser. Browser 125 can allow a user to browse and interact with web pages, web sites, web-based applications, and other client-server applications. Client device 120 can also store, receive, generate or access data 128 that can be used by the client device 120. For instance, client device 120 can store, receive, generate, or access input data that can be used to update or generate a web document, such as an HTML document, for presentation on the browser 125. In addition, the client device 120 can store markup language representations associated with a web application, such as a web based email service, that can be used by a template generator to construct a markup language template according to any of the methods disclosed herein.

Figure 2:
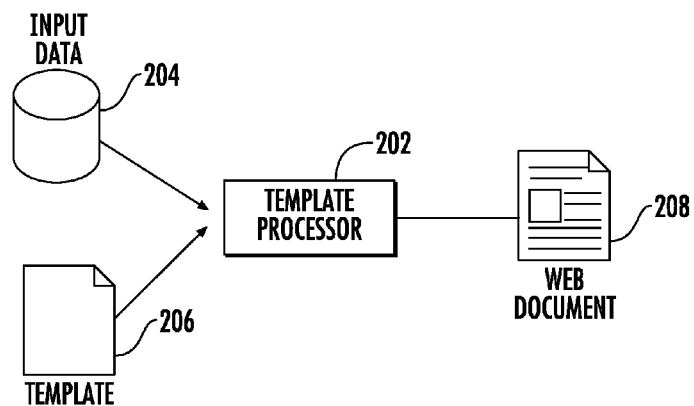
FIG. 2 depicts a diagram of template processing used to generate a web document.

The server 110 and the client device 120 can be configured perform template processing techniques to generate a web document for display on a browser 125 of the client device 120. FIG. 2 generally illustrates how template processing can be used to generate a web document, such as an HTML document. As shown, template processor 202 can receive input data 204 and a template 206. Template processor 202 can be configured to bind the input data 204 to the template 206 to generate a web document 208.

Input data 204 typically contains the data that needs to be presented in the web document 208. Input data 204 can be defined in a data structure, such as protocol buffer, and can include one or more types of data, such as simple data and/or one or more data objects. The data objects can be specified using a programming language (e.g. JavaScript). The input data 204 can be available at server 110 (see FIG. 1) or can be available at a client device 120. Alternatively, the input data 204 can be available at both the server 110 and the client device 120.

Referring to FIG. 2, template 206 typically contains layout instructions that specify how to layout the data in the web document 208. For instance, the layout instructions can specify fonts, colors, paragraph layout, tables, lists, sections, image locations, image sizes, etc. within the web document 208. The layout instructions can be in any suitable format, such as HTML format.

The template 206 can further include template-processing instructions that tell the template processor 202 how to bind input data 204 to the template 206. The template-processing instructions can include one or more template parameters that refer to elements stored in input data 204. During processing of the template, the template processor 202 can evaluate the template parameter to generate a string or object in the web document 208. The template-processing instructions can involve simple variable substitution or can be relatively complex, In general., template-processing instructions can be as powerful as general purpose programming instructions.

It certain instances, it can be desirable to change a web application from one type of template processing system to another type of template processing system. For instance, an improved template processing system for a web application can be developed and it can be desirable to migrate the web application from the old template processing system to the new template processing system. The migration from a first template processing system to a second template processing system requires the development of a new template for the web application as well as a new corresponding input data structure for the template processing system.

Figure 3:
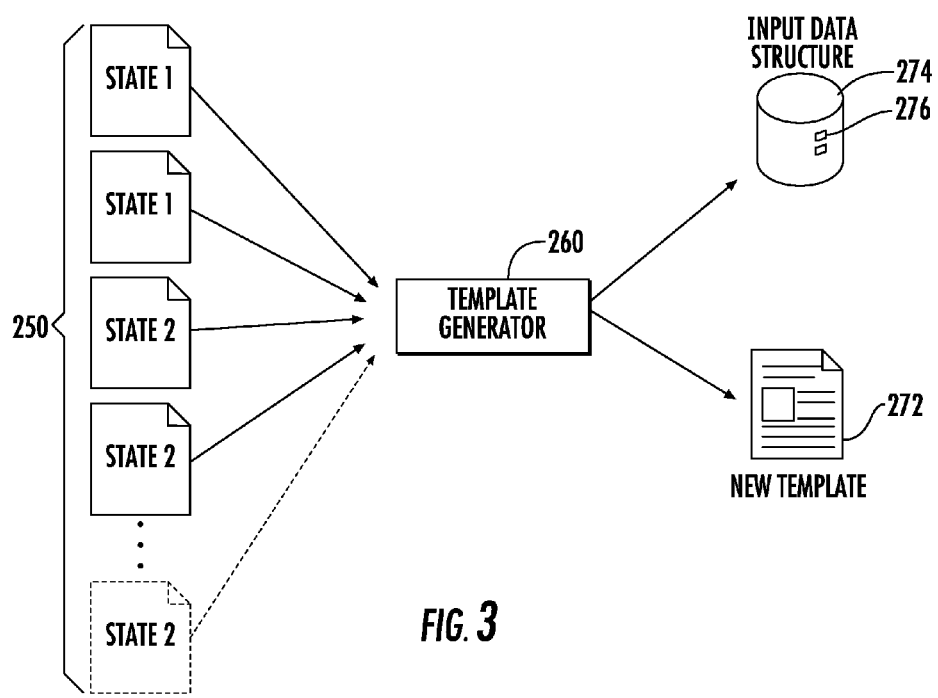
FIG. 3 depicts a diagram of constructing a markup language template and associated input data structure from a plurality of markup language representations according to an exemplary embodiment of the present disclosure.

FIG. 3 depicts the construction of a new markup language template according to an exemplary embodiment of the present disclosure. As shown, a plurality of markup language representations 250, such as HTML representations, of a user interface of the same web application are accessed by a template generator 260. One of the markup language representations 250 is illustrated in dashed line to indicate that any suitable number of markup language representations 250 can be accessed by the template generator 260 without deviating from the scope of the present disclosure. For instance, any number of markup language representations 250 greater than two markup language representations 250 can be accessed by the template generator 260.

Each of the plurality of markup language representations 250 is associated with different input data for the same web application. For instance, in the example of a web search application, the markup language representations of the web search result page for different search queries can be accessed by the template generator 260. In the example of a web based email application, the markup language representations of the user interface associated with the web application for different messages, different labels, and/or different users can be accessed by the template generator 260.

The different markup language representations 250 can be associated with the same state of the web application or associated with different states of the web application. In the exemplary embodiment depicted in FIG. 3, the markup language representations 250 associated with two different states of the web application are accessed by the template generator 260. The differing states of the web application can be associated with different status, view, appearance, response, presentation or other state of a web application that can change based on a variety of factors, such as user interaction with the web application. For instance, in the example of a web based email application, a first state of the web application can be associated with the display of an inbox. Another state of the web application can be associated with the display of an individual message in the inbox. Yet another state of the application can be associated with the display of deleted items, sent items, or other folder. In the case where markup language representations are accessed across multiple states of the application, it can be desirable to access at least two markup language representations for each state.

The template generator 260 can access the markup language representations 250 either directly from a server in the case where the server generates the markup language representation 250. For instance, in the example of a web search application, the markup language representations 250 can be obtained from the web server hosting the web search application. In the case where the markup language representations are generated by a browser implemented on a client device, such as in a web based email application, the markup language representations 250 can be obtained from the client device. For instance, the markup language representations 250 can be obtained by traversing and serializing the document object model (DOM) inside the browser where the markup language representation is generated by the web application. According to a particular aspect of the present disclosure, the markup language representations 250 are outputs of a template processing system, such as a HTML document generated using a template processing system.

The template generator 260 can be implemented by a processor executing computer readable instructions to perform the methods for constructing a markup language template discussed herein. As shown in FIG. 3, the template generator 260 is configured to generate a new markup language template 272, a corresponding input data structure 274 for the new markup language template 272, and example instances 276 of input data in the input data structure 274.

The new markup language template 272 can include a plurality of layout instructions specifying how to layout data in a web document. The new markup language template 272 can further include a plurality of template processing instructions that specify how to bind input data from the corresponding input data structure 274 to the markup language template 272. In particular, the template processing instructions map data contained in one or more data fields of the input data structure 274 to the markup language template 272.

The new markup language template 272 can be in a format dictated by a new template processing system. For instance, the template processing instructions can be expressed in a format associated with a new template processing system. In this manner, the template generator 260 can construct a new markup language template 272 that can be used in association with a new template processing system based on a plurality of markup language representations 250 generated by an older or a previously used template processing system.

In one example, the markup language template 272 is in a format that allows the template to act as both a template and a valid markup language for display in a browser. For instance, the template processing instructions of the markup language template 272 can be expressed as custom HTML attributes that do not interfere with the display of the template 272. Because the markup language template 272 includes template processing instructions that are proper HTML, the HTML output of another template processing system can be easily shifted to the new markup language template by very small modifications, which preserve the validity of the HTML.

The input data structure 274 can be any suitable format for providing input data to the newly created markup language template 272. For instance, the input data structure 274 can be in a protocol buffer format. The input data structure 274 can include a plurality of data fields that are mapped to the markup language template 272. The data fields can take any appropriate form and can be of varying complexity. For instance, certain the data fields can be repeated data fields that allow for differing number of inputs to be provided to the markup language template 272. The data fields can also refer to data fields in other data structures, such as data fields in other protocol buffers.

The input data associated with the markup language representations 250 can be used to create example instances of input data 276 in the input data structure 274. The example instances 276 can be used to generate markup language representations of the web application for input data associated example instances 276 using the new markup language template 272 pursuant to the new template processing system.

Figure 4A:
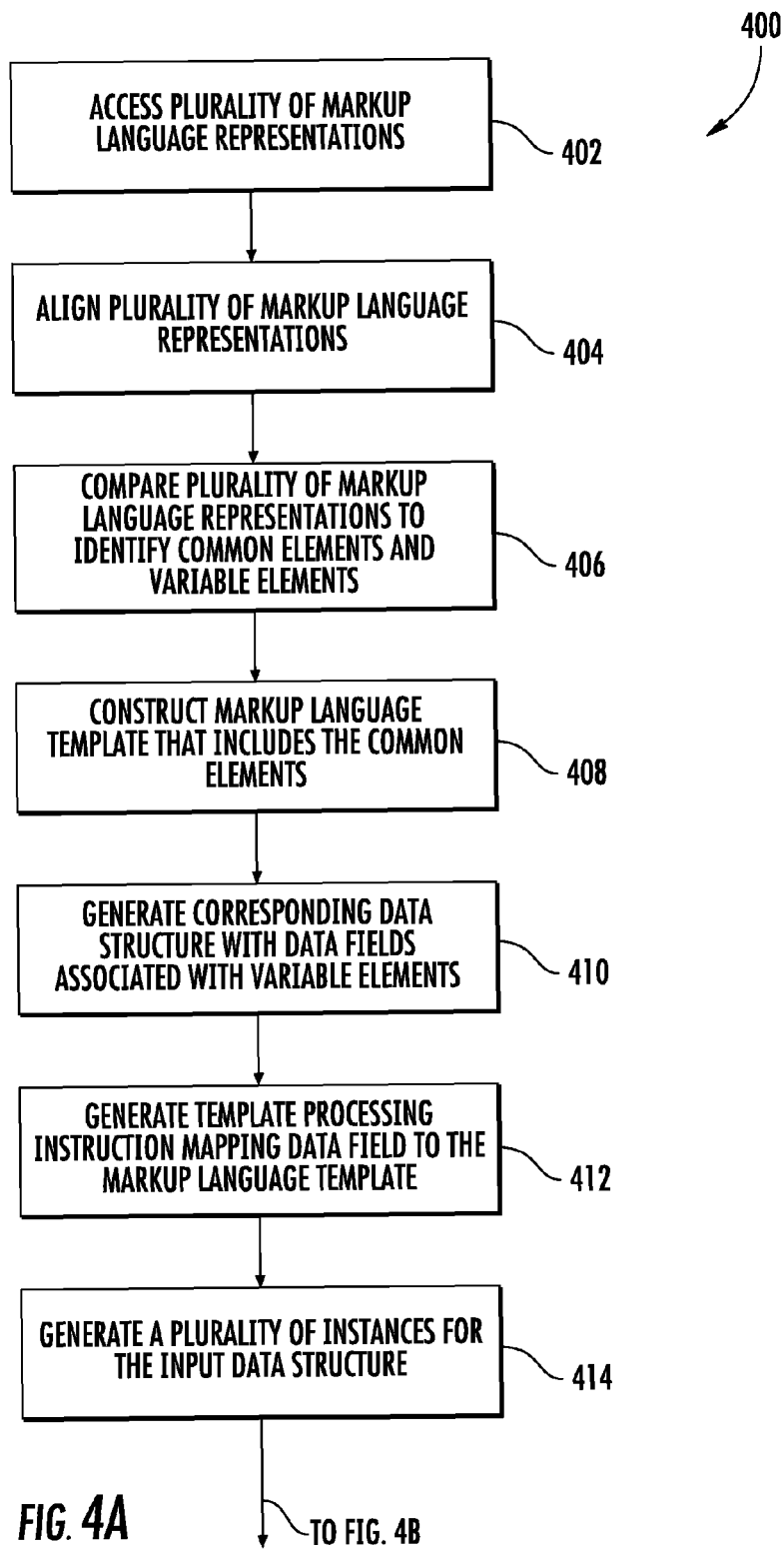
FIGS. 4A and 4B depict a flow diagram of an exemplary method according to an exemplary embodiment of the present disclosure.
Figure 4B:
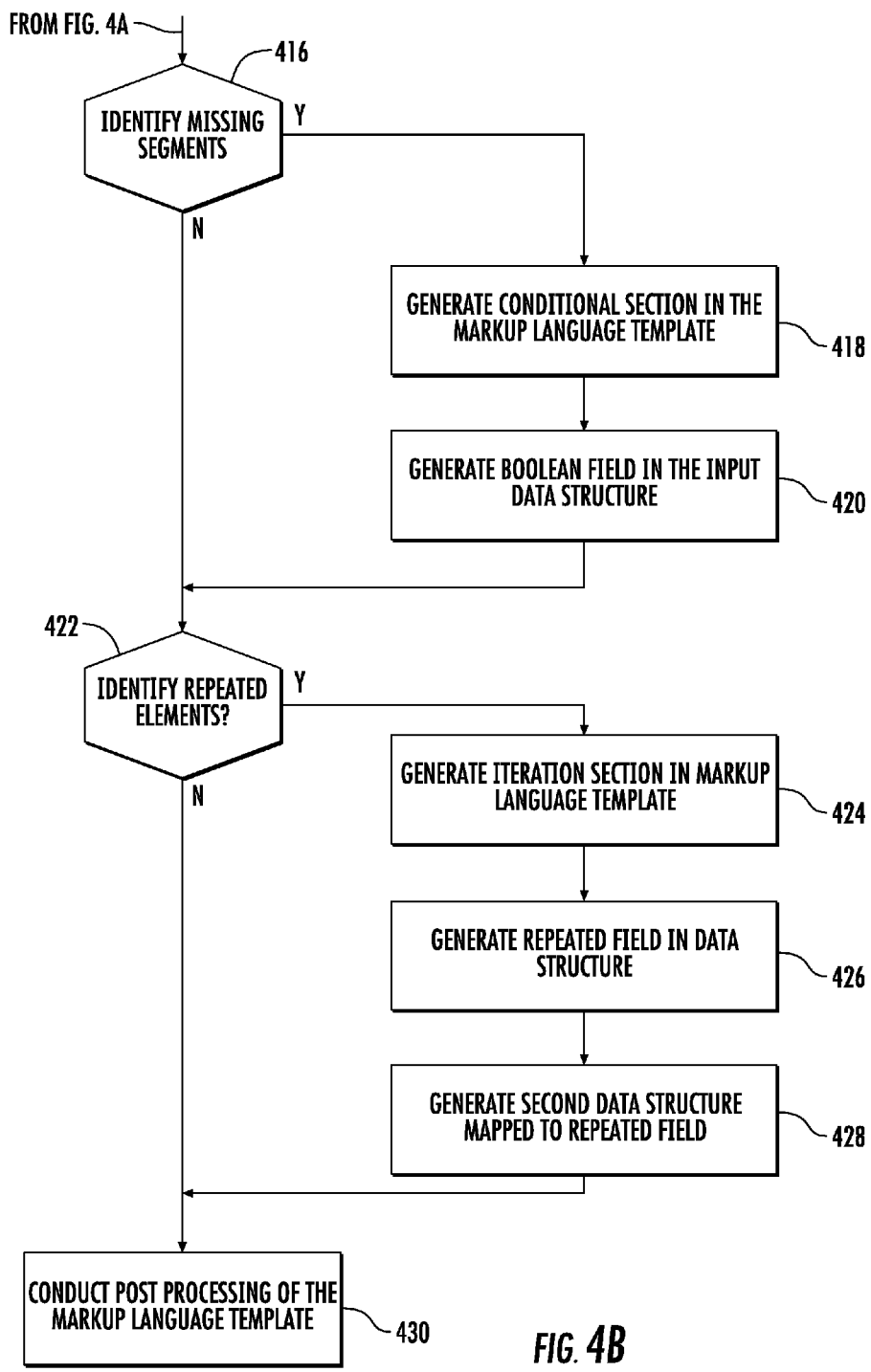

FIGS. 4A and 4B depict a flow diagram of an exemplary method (400) that can be implemented by template generator 260 to create a markup language template and corresponding input data structure according to an exemplary embodiment of the present disclosure. The exemplary method (400) can be implemented by the processor of any computing device, such as the processor 112 of computing device 110 of FIG. 1. In addition, although FIGS. 4A and 4B depict steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways without deviating from the scope of the present disclosure.

Referring to FIG. 4A at (402), a plurality of markup language representations associated with a user interface of the same web application can be accessed. As discussed above, each of the plurality of markup language representations can be based on different input data for the web application. The markup language representations can also be associated with different states of the web application. In one aspect, the markup language representations are outputs from a template processing system, such as HTML documents output by a template processing system.

At (404), the plurality of markup language representations are aligned to facilitate comparison of the plurality of markup language representations. For instance, the plurality of markup language representations can be grouped with similar markup language representations to facilitate comparison across all of the markup language representations. As an example, markup language representations associated with a first state of the web application can be grouped together while markup language representations associated with a second state of the web application can be grouped together to facilitate comparison of the plurality of markup language representations. A variety of alignment techniques can be used to facilitate the comparison of the markup language representations of the web application without deviating from the scope of the present disclosure.

At (406), the method includes comparing the plurality of markup language representations to identify common elements and to identify variable elements. Common elements are elements that are shared across the plurality of markup language representations. Variable elements are elements that differ between the plurality of markup language representations. The common elements can be determined to be associated with elements that should be included in the markup language template while the variable elements can be determined to be associated with input data for the markup language template.

At (408), a new markup language template is constructed that includes the identified common elements. In this manner, the new markup language template includes elements that are shared across the markup language representations of the web application. In many cases, common elements are layout instructions for the markup language template. The layout instructions can specify can specify fonts, colors, paragraph layout, tables, lists, sections, image locations, image sizes, etc. and other common elements within the markup language template. For instance, in the example of a web search application, the common elements can include elements associated with the search field, background color, font color, link color, header and footer items, and other information normally displayed in the web search application. In the example of a web based email application, the common elements can include, for instance, elements defining the layout of the user interface associated with the web based application, such as the location and appearance of the inbox, mail folders, deleted items, and other information normally displayed in the web based email application.

Common elements can also include template-processing instructions or other elements associated with the web application. For instance, the plurality of markup language representations can have the same template processing instructions binding the same input data to the markup language template. These common template processing instructions can become a part of the new markup language template.

At (410), the method includes generating an input data structure corresponding to the newly created markup language template based on the variable elements identified in the markup language representations. The input data structure can include one or more data fields associated with the identified variable elements. These data fields can be populated with input data for the web application. The input data structure can take any suitable format. In one example, the input data structure is provided in a protocol buffer format.

At (412), template processing instructions are generated for the markup language template that map the one or more data fields of the input data structure to the markup language template. When the template processing instructions are processed during template processing, input data stored in the one or more data fields are provided to the markup language template in accordance with the template processing instructions.

At (414), the method includes generating a plurality of instances for the generated input data structure based on the input data of the different markup language representations. The plurality of instances include the example input data for the web application associated with the plurality of markup language representations of the web application. The plurality of instances can be used, for instance, to test the feasibility of the new markup language template. In particular, once the new markup language template has been generated, template processing techniques can be performed based on the example instances to determine if the new markup language template can reproduce the plurality of markup language representations of the web application.

Referring to FIG. 4B at (416), the method includes identifying any missing segments in the plurality of markup language representations. In particular, the method includes identifying a missing segment in one of the plurality of markup language representations relative to the other markup language representations. The presence of a missing segment in one of the plurality of markup language representations relative to the other markup language representations can be indicative of different states of the web application.

For instance, in the example of a web based email application, the plurality of markup language representations can include markup language representations associated with the display of an inbox and markup language representations associated with the display of individual messages in the inbox. The markup language representations associated with the display of individual messages will have missing segments relative to the markup language representations associated with the display of the inbox.

If no missing segments are identified, the method can continue to (422) as shown in FIG. 4B. If a missing segment is identified, a conditional section associated with the missing segment is generated in the markup language template (418). The conditional section in the markup language template is implemented only if the web application is going to be in a particular state. For instance, the conditional section in the markup language template will be implemented or be included as part of a document generated from the markup language template only if the web application is in a certain state.

To control the state of the web application, a Boolean field can be created in the input data structure (420) corresponding to the conditional section. The input data in the Boolean field controls whether the conditional section of the markup language template will become part of a generated web document during template processing of the markup language template. For instance, a true Boolean value provided in the Boolean field can indicate that the conditional section is to be used in generating a web document during template processing. A false Boolean value provided in the Boolean field can indicate the conditional section is not to be used in generating a web document during template processing. The value provided in the Boolean field can be based on user interaction with the web application. The set of all conditional sections generated in the markup language template, along with the corresponding Boolean fields in the input data structure, can provide a representation of the different application states associated with the web application.

At (422), the method identifies whether there are any repeated elements that are repeated in different numbers in the plurality of markup language representations. As an example, the method can identify that a first markup language representation includes a first number of repeated elements and that a second markup language representation includes a second and different number of repeated elements. The differing numbers of repeated elements in the markup language representations can be indicative of an iteration section in the web based application.

For instance, in the example of a web search application, repeated elements associated with different numbers of search results can be identified across the markup language representations of the web based search application. In the example of a web based email application repeated elements associated with differing numbers of email messages in an inbox can be identified across the markup language representations.

If no repeated elements of differing numbers are identified, the method can continue to (430) as shown in FIG. 4B. If repeated elements of differing numbers are identified, an iteration is generated in the markup language template (424). A repeated field in the input data structure can also be generated (426) and mapped to the iteration section in the markup language template using a template processing instruction. In addition, a second input data structure for input data associated with the repeated elements can be generated (428). The second input data structure can be associated with the repeated field of input data structure such that input data in the second input data structure can be used to populate the repeated field of the input data structure.

At (430), the method includes conducting post processing of the newly generated markup language template to clean up the markup language template and to put the markup language template in better condition for use in a template processing system. For instance, although the markup language template and corresponding input data structure generated according to aspects of the present disclosure are syntactically well defined, they may not be optimal for certain template processing applications. Because the markup language template is syntactically well defined, however, the markup language template can be suitable for semiautomatic and robust refactoring. In one example, the template can be processed to remove unused instructions or redundant instructions. In addition, a developer can use the newly generated markup language template as a building block or starting point for using the improved template processing system.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for constructing a template for use in template processing of a document associated with a web application, comprising:
    accessing a plurality of markup language representations of a user interface of the web application, each of the plurality of markup language representations being based on different input data for the web application;
    comparing the plurality of markup language representations to identify at least one common element, at least one variable element, and one or more repeated elements that are repeated in different numbers in the plurality of markup language representations;
    constructing a markup language template that includes the at least one common element and an iteration section, wherein the iteration section is based on the one or more repeated elements;
    generating an input data structure separate from the markup language template based on the at least one variable element and the one or more repeated elements, the input data structure comprising at least one data field associated with the variable element and further comprising at least one repeated field associated with the one or more repeated elements;
    generating a template processing instruction for the markup language template, the template processing instruction mapping the at least one data field of the input data structure to the markup language template; and
    generating a second template processing instruction for the markup language template, the second template processing instruction mapping the at least one repeated field of the input data structure to the iteration section in the markup language template.

2. The computer-implemented method of claim 1, wherein the method comprises generating a plurality of instances for the input data structure based on the different input data.

3. The computer-implemented method of claim 1, wherein the template processing instruction is embedded in the markup language template such that the markup language template is both a template and a valid document for display for the web application.

4. The computer-implemented method of claim 1, wherein each of the plurality of markup language representations of the user interface is an output of a template processing system.

5. The computer-implemented method of claim 1, wherein the plurality of markup language representations of the user interface comprise markup language representations of the user interface in a plurality of different states of the web application.

6. The computer-implemented method of claim 5, wherein the plurality of markup language representations comprise more than two markup language representations for the web application, the more than two markup language representations comprising at least two markup language representations for each of the plurality of different states of the web application.

7. The computer-implemented method of claim 5, wherein the method comprises:
    identifying a missing segment in one of the plurality of markup language representations relative to one or more of the other markup language representations in the plurality of markup language representations; and
    generating a conditional section in the markup language template based on the missing segment, the conditional section associated with a state of the web application.

8. The computer-implemented method of claim 7, wherein the method comprises generating a Boolean field in the input data structure associated with the conditional section, the input data for the Boolean field controlling the state of the web application.

9. The computer-implemented method of claim 1, wherein the
    identified one or more repeated elements indicate iteration sections of a web application, the one or more repeated elements comprising at least one of a listing of emails or search results.

10. The computer-implemented method of claim 1, wherein the method comprises
    generating a second input data structure for variable elements associated with the identified one or more repeated elements; and
    associating the second input data structure with the at least one repeated field in the input data structure.

11. The computer-implemented method of claim 1, wherein the method comprises processing the markup language template to remove unused instructions.

12. A computing system configured to construct a template for use in template processing associated with a web application, the computing system comprising:
    one or more processors; and
    at least one memory, the at least one memory storing a plurality of markup language representations of a user interface of the web application, each of the plurality of markup language representations being based on different input data for the web application;
    the one or more processors configured to execute computer-readable instructions stored in the memory to implement a template generator, the template generator configured to compare the plurality of markup language representations to identify at least one common element, at least one variable element, and further to identify a missing segment in one of the plurality of markup language representations relative to one or more of the other markup language representations in the plurality of markup language representations; the template generator configured to construct a markup language template that includes the at least one common element and a conditional section based on the missing segment, the conditional section associated with a state of the web application: and the template generator configured to generate an input data structure separate from the markup language template based on the at least one variable element, the input data structure comprising at least one data field associated with the variable element and a Boolean field associated with the conditional section;

wherein the template generator is further configured to generate a template processing instruction for the markup language template, the template processing instruction mapping the at least one data field of the input data structure to the markup language template.

13. The computing system of claim 12, wherein the template generator is further configured to generate a plurality of instances for the input data structure based on the different input data.

14. The computing system of claim 12, wherein the plurality of markup language representations of the web application comprise markup language representations of the user interface in a plurality of different states of the web application.

15. The computing system of claim 14, wherein the input data for the Boolean field controls the state of the web application.

16. The computing system of claim 12, wherein the template generator is further configured to identify one or more repeated elements that are repeated in different numbers in the plurality of markup language representations and to generate an iteration section in the markup language template based on the one or more repeated elements.

17. One or more tangible, non-transitory computer-readable media having computer-readable instructions stored thereon that when executed by one or more processors cause the one or more processors to:

access a plurality of markup language representations of a user interface of a web application, each of the plurality of markup language representations being based on different input data;

compare the plurality of markup language representations to identify at least one common element, at least one variable element, and one or more repeated elements that are repeated in different numbers in the plurality of markup language representations;

construct a markup language template that includes the at least one common element and an iteration section based on the one or more repeated elements;

generate an input data structure separate from the markup language template based on the at least one variable element and the one or more repeated elements, the input data structure comprising at least one data field associated with the variable element and further comprising at least one repeated field associated with the one or more repeated elements;

generate a template processing instruction for the markup language template, the template processing instruction mapping the at least one data field of the input data structure to the markup language template; and generate a second template processing instruction for the markup language template, the second template processing instruction mapping the at least one repeated field of the input data structure to the iteration section in the markup language template.

18. The one or more computer-readable media of claim 17, wherein the computer-readable instructions when executed by one or more processors cause the one or more processors to:

identify a missing segment in one of the plurality of markup language representations relative to one or more of the other markup language representations in the plurality of markup language representations;

generate a conditional section in the markup language template based on the missing segment, the conditional section associated with a state of the web application; and generate a Boolean field in the input data structure associated with the conditional section, the input data for the Boolean field controlling the state of the web application.

19. The one or more computer-readable media of claim 17, wherein the computer-readable instructions when executed by one or more processors cause the one or more processors to:

generate a second input data structure for variable elements associated with the identified one or more repeated elements; and associate the second input data structure with the at least one repeated field in the input data structure.

* * * * *